(12) United States Patent
Sovoda

(10) Patent No.: US 7,007,368 B2
(45) Date of Patent: Mar. 7, 2006

(54) HEM CONSTRUCTION FOR VEHICULAR CLOSURE STRUCTURE

(75) Inventor: Brent R. Sovoda, Dearborn, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 176 days.

(21) Appl. No.: 10/707,063

(22) Filed: Nov. 19, 2003

(65) Prior Publication Data

US 2005/0102817 A1    May 19, 2005

(51) Int. Cl.
    *B23P 11/00* (2006.01)
(52) U.S. Cl. .............................. 29/509; 29/505; 403/282
(58) Field of Classification Search .................. 29/509, 29/505, 439, 438, 437, 433, 428, 458; 403/282
    See application file for complete search history.

(56) References Cited

U.S. PATENT DOCUMENTS

| | | | |
|---|---|---|---|
| 3,909,918 A | 10/1975 | Talozawa et al. | |
| 4,293,363 A | 10/1981 | Wakabayashi et al. | |
| 4,700,981 A | 10/1987 | Seyler | |
| 4,719,689 A | 1/1988 | Yamamoto et al. | |
| 5,237,734 A | 8/1993 | Polon | |
| 5,470,416 A | 11/1995 | Herring, Jr. et al. | |
| 5,948,185 A * | 9/1999 | Krajewski et al. | .......... 148/698 |
| 6,000,118 A | 12/1999 | Biernat et al. | |
| 6,029,334 A | 2/2000 | Hartley | |

FOREIGN PATENT DOCUMENTS

JP    03210917 A  *  9/1991

\* cited by examiner

*Primary Examiner*—John C. Hong
(74) *Attorney, Agent, or Firm*—Gigette M. Bejin; Artz & Artz P.C.

(57) ABSTRACT

A hem joint for a vehicular closure structure assembled from stamped sheet metal includes an inner panel having circular raised anchor pins formed integrally with the inner panel prior to assembly of the inner panel with an outer panel. A flange formed from the outer panel is coined over each anchor pin so as to completely encapsulate an end portion of each anchor pin, mechanically interlocking the inner and outer panels.

9 Claims, 3 Drawing Sheets

HEM CONSTRUCTION FOR VEHICULAR CLOSURE STRUCTURE

BACKGROUND OF INVENTION

1. Field of the Invention

The present invention relates to hem joints used in vehicular closure structures such as doors and lift gates.

2. Disclosure Information

Vehicle closure structures such as passenger doors, tailgates for station wagons and sport utility vehicles, and decklids and engine compartment hoods, commonly employ a construction detail wherein an outer panel is flanged over and joined with an inner panel. This flange joint, sometimes termed a "hem" joint, has been made up in a variety of ways, including by welding, adhesive bonding, and several types of mechanical joining. U.S. Pat. No. 5,237,734 illustrates a type of mechanical joining in which a raised rectangular bead is formed on one of the components to be joined, with the other component being stamped down over the bead, either with or without a slot being formed in the second component.

Known techniques for making up and joining hem flanges suffer from several deficiencies. In the case of structure shown in the '734 patent, the outer panel is not locked with the inner panel to the degree necessary to prevent torsional shifting of the outer and inner panels during handling of the panels prior to installation on the vehicle. And, welding techniques injure the outer surface of the panel, necessitating labor intensive and expensive metal finishing operations.

The present invention solves problems associated with known panel joining techniques by providing a 360° retention capability with a mechanical interlock, which combined with adhesive joining allows panels to not only be produced without torsional distortion caused by shifting of the inner and outer panels after the hem flanging operation, but which also avoids problems associated with corrosion and surface defects.

SUMMARY OF INVENTION

A hem joint for a vehicular closure structure assembled from stamped sheet metal includes an inner panel, and an outer panel joined to the inner panel by a hem flange formed from the outer panel and folded over at least a portion of the periphery of the inner panel. A plurality of mechanical interlock zones extends between the inner panel and the outer panel, with each of the interlock zones comprising a raised circular anchor pin formed integrally from the inner panel prior to assembly of the inner panel with the outer panel, and a coined cap formed integrally with the hem flange of the outer panel, with the coined cap being formed in place by coining the hem flange over the raised circular anchor pin so as to completely encapsulate an end portion of the anchor pin. A hem structure according to the present invention preferably further comprises an adhesive placed between the inner panel and the outer panel before the inner and outer panels are assembled and the hem flange is formed. This adhesive may be filled with granular material to prevent extrusion of the adhesive from the hem joint during the flanging operation.

According to another aspect of the present invention, a method for manufacturing a vehicular closure structure from stamped sheet metal includes the steps of stamping an outer panel, stamping an inner panel, and forming a plurality of integral, circular anchor pins extending inwardly from the inner panel within a region of the inner panel which is overlaid by an inner portion of the outer panel when the closure panel is assembled. After applying an adhesive between the inner and outer panels, the outer and inner panels are fixtured together, and a portion of the outer panel is folded over the region of the inner panel containing the circular anchor pins. In the following step of the process, integral circular caps are coined from the inner panel over each of the circular anchor pins. Then, the completed vehicular closure structure is placed in a storage medium for a length of time sufficient to allow the adhesive previously placed between the outer and inner panels to at least partially cure.

Other advantages, as well as objects and features of the present invention, will become apparent to the reader of this specification.

DETAILED DESCRIPTION

Figure 1:
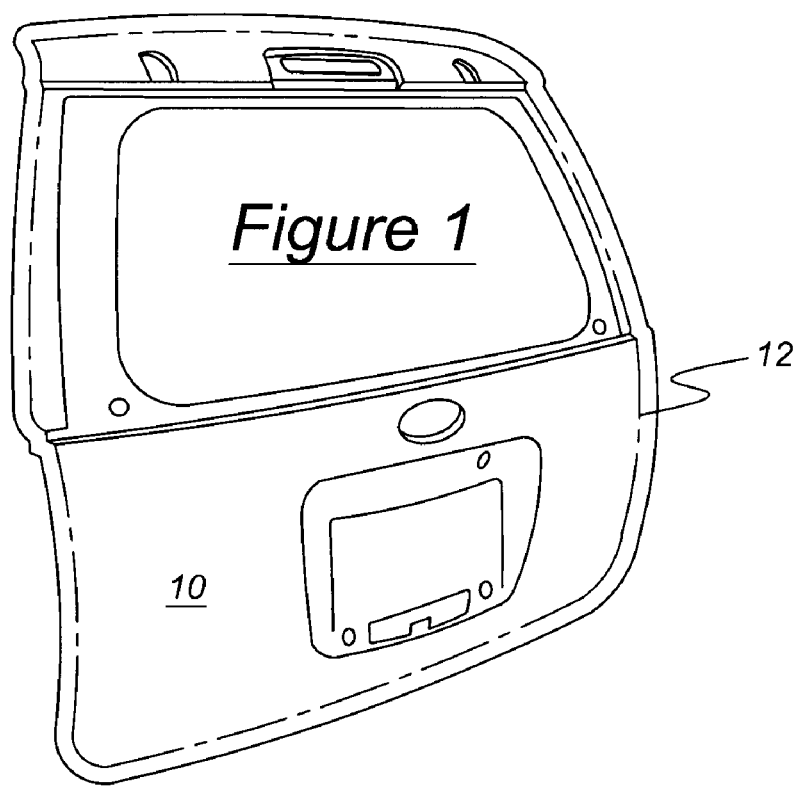
FIG. 1 shows an outer panel of the vehicular closure structure according to the present invention.
Figure 2:
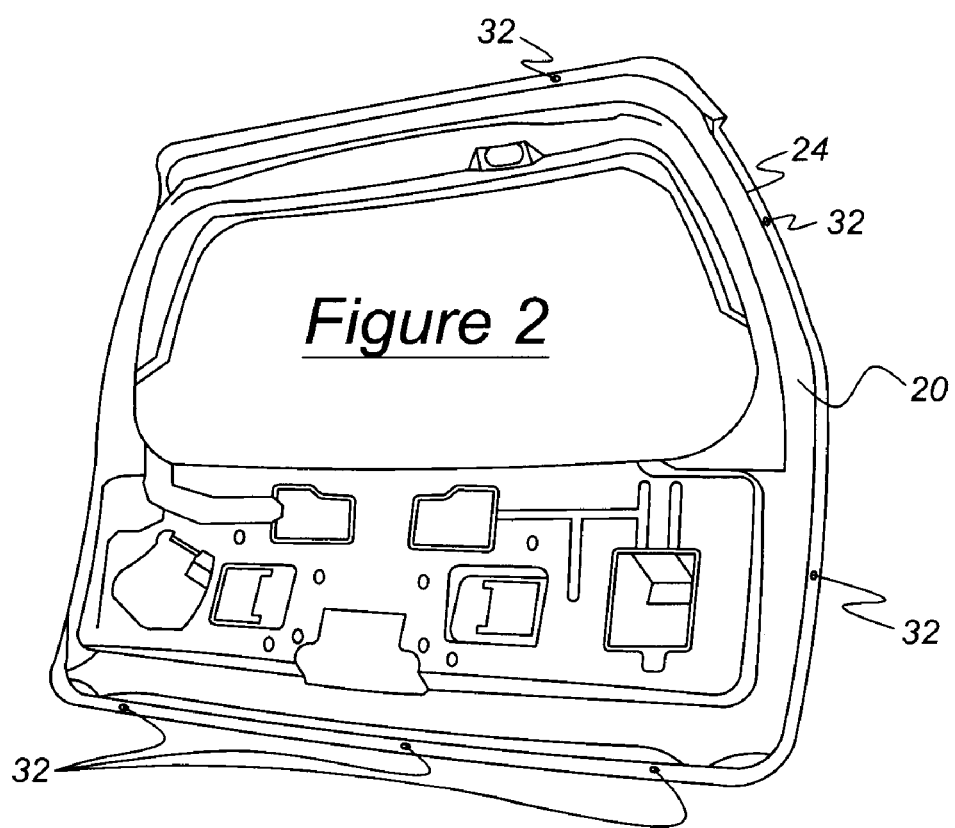
FIG. 2 illustrates an inner panel of the vehicular closure structure according to the present invention.

As shown in FIGS. 1 and 2, a vehicular closure structure according to the present invention is produced from stamped sheet metal. Outer panel 10 has flange 12 about its outer periphery. Flange 12 is eventually folded down upon a portion of the outer periphery of inner panel 20. Inner panel 20 has a region 24 which is overlaid by flange portion 12 of outer panel 10 when the present closure structure is assembled.

Figure 3:
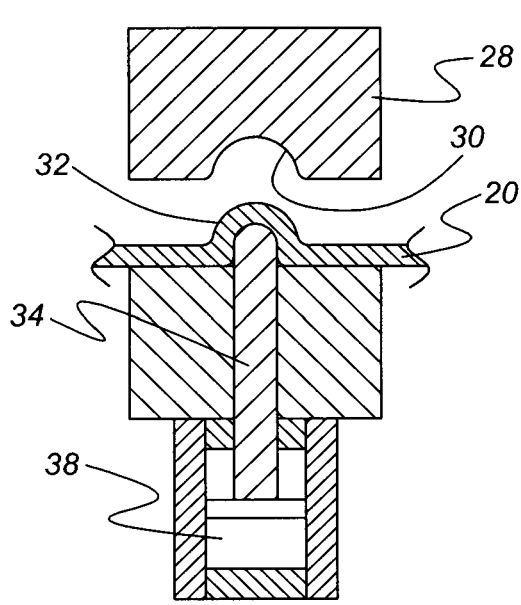
FIG. 3 illustrates an apparatus for producing circular anchor pins according to one aspect of the present invention.

FIG. 3 illustrates formation of integral circular anchor pins 32. To perform this operation, inner panel 20 is placed in a fixture containing anchor pin die 28 having cavity 30. Then, punch 34 which is driven by power cylinder 38 moves upwardly and forms anchor pin 32. Anchor pins 32 are formed at a plurality of locations as shown in FIG. 2. Those skilled in the art will appreciate in view of this disclosure that operation of forming circular anchor pins 32 may be performed either after inner panel 20 is stamped or during stamping of inner panel 20. Moreover, the punch and die arrangement shown in FIG. 3 may be employed either at a single station, or preferably, at multiple stations permitting all of anchor pins 32 to be formed simultaneously, thereby reducing cycle time. Moreover, power cylinder 38 may be either hydraulic or pneumatic, or could comprise a cam driven mechanism or other types of drives known to those skilled in the art and suggested by this disclosure. In any event, anchor pin 32 preferably has a standing height which approximates the thickness of outer panel 10.

Figure 4:
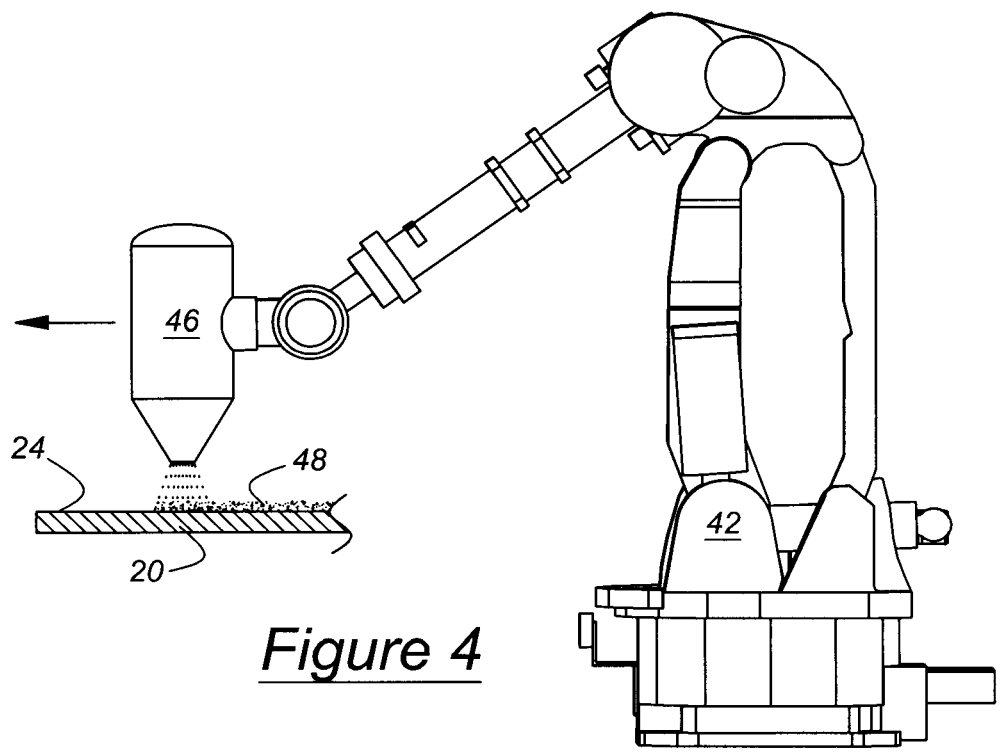
FIG. 4 illustrates robotic application of an adhesive according to the present invention.

FIG. 4 illustrates a station in which robot 42 having sprayer head 46 applies adhesive 48 to region 24 of inner panel 20. The adhesive used with a system according to the present invention may be either two-component adhesive or a single-component adhesive. Although a two-component adhesive provides a catalytically driven curing process, single-component adhesive are generally more economical. Because the mechanical interlock zones produced by circular anchor pins 32 and coined caps 60 according to the present invention provide superior mechanical joining of the inner and outer panels, it is possible with many assemblies to use a single component adhesive, thereby producing closure structures at a more economical price.

Figure 5:
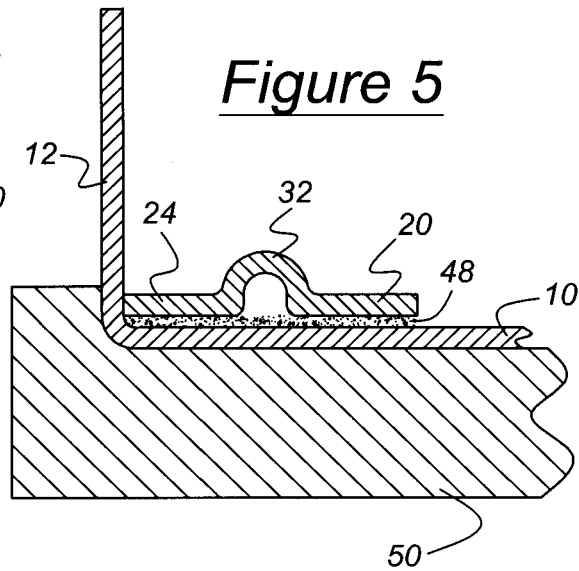
FIG. 5 shows closure structure inner and outer panels which have been placed in a hemming fixture according to the present invention.
Figure 6:
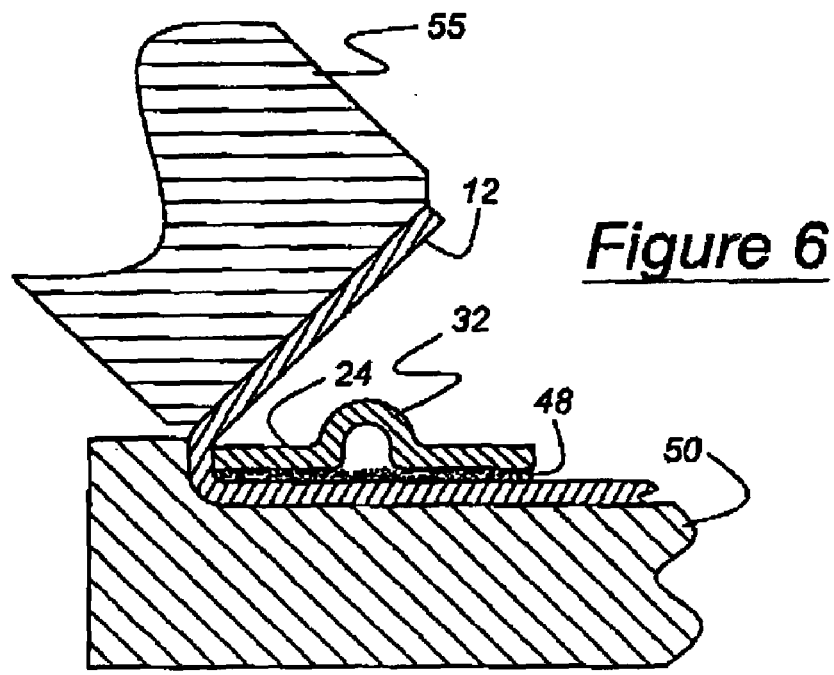
FIG. 6 illustrates a hem steel folding hem to a 45° angle according to the present invention.
Figure 7:
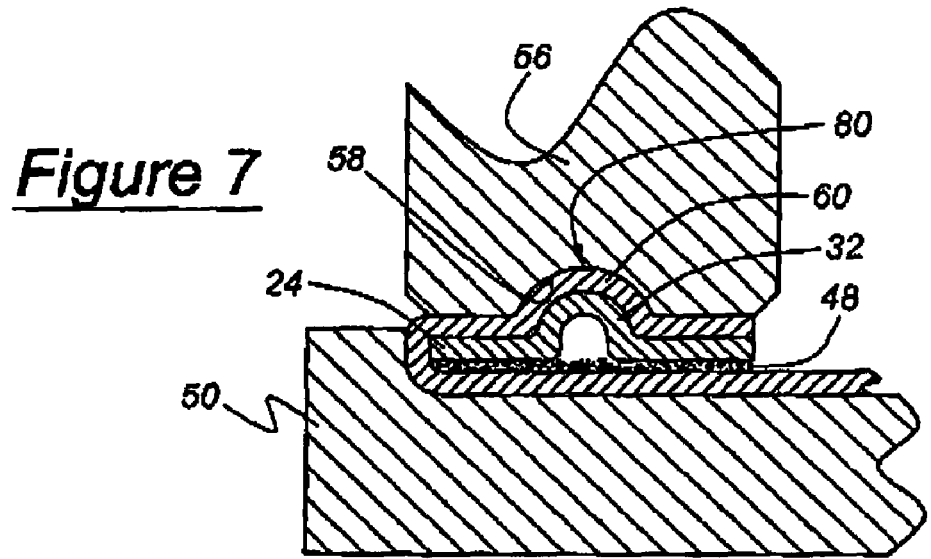
FIG. 7 illustrates the coining process for producing circular cap on a circular anchor pin according to the present invention.

FIGS. 5–7 illustrate inner panel 20 and outer panel 10 fixtured in hemming machine 50, which may be selected from a plurality of conventional hemming machines known to those skilled in the art and suggested by this disclosure. Clamps (not shown) allow panels 10 and 20 to be held in machine 50 while first hem steel 55 moves flange 12 down to a 45° angle, as shown in FIG. 6. Once hem steel 55 has produced 45° angle for flange 12, hem steel 56 is used to simultaneously fold flange 12 to a 90° flattened position, while simultaneously coining integral circular cap 60 from flange 12 (FIG. 7). Hem steel 56 has an integral coining die cavity 58 formed therein, so as to allow a portion of flange 12 to be upset out of the plane of flange 12, so that circular cap 60 completely encapsulates the upper portion of circular anchor pin 32, forming mechanical interlock zone 80. Because neither inner panel 20, nor outer panel 10, is pierced during a process according to the present Invention, the hem joint according to this invention will have superior corrosion resistance as compared with mechanically interlocked joints which either pierce the panels being joined or create voids which allow moisture and road splash to collect, thereby promoting corrosion.

After the assembly shown in FIG. 7 is produced, the closure structure may be placed in a shipping rack to allow adhesive 48 to cure sufficiently to permit the completed structure to be handled during subsequent painting and assembly operations without altering the geometry of the closure structure. Each one of circular anchor pins 32 and its mating coined circular cap 60 resists sliding of outer panel 10 with respect to inner panel 20 in a full 360° orientation; this advantage gives the hem joint integrity needed to allow adhesive 48 to cure without torsional twisting of the closure panel.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A hem joint for a vehicular closure structure assembled from stamped sheet metal, comprising:
    an inner panel;
    an outer panel joined to said inner panel by a hem flange formed from said outer panel and folded over at least a portion of the periphery of said inner panel; and
    a plurality of mechanical interlock zones extending between said inner panel and said outer panel, with each of said interlock zones comprising:
    a raised circular anchor pin formed integrally from said inner panel prior to assembly of said inner panel with said outer panel; and
    a coined cap formed integrally with said hem flange of said outer panel, with said coined cap being formed in place by coining said hem flange over said raised circular anchor pin, so as to completely encapsulate an end portion of said anchor pin.

2. A hem structure according to claim 1, further comprising an adhesive placed between said inner panel and said outer panel before said hem flange is formed.

3. A hem structure according to claim 2, wherein said adhesive is filled with granular material.

4. A method of manufacturing a vehicular closure structure from stamped sheet metal, comprising the steps of:
    stamping an outer panel;
    stamping an inner panel;
    forming a plurality of circular anchor pins from said inner panel, with each of said anchor pins extending inwardly from said inner panel within a region of said inner panel which is overlaid by an inner portion of said outer panel when said closure panel is assembled;
    fixturing said outer and inner panels together;
    folding a portion of said outer panel over said region of the inner panel containing said circular anchor pins; and
    coining an integral circular cap from said inner panel over each one of said plurality of anchor pins.

5. A method of manufacturing a vehicular closure structure according to claim 4, further comprising the steps of:
    applying an adhesive to said region of said inner panel containing said circular anchor pins;
    placing said vehicular closure structure in a storage medium for a length of time sufficient to allow said adhesive to cure.

6. A method of manufacturing a vehicular closure structure from stamped sheet metal, comprising the steps of:
    stamping an outer panel;
    stamping an inner panel;
    forming a plurality of circular anchor pins extending inwardly from said inner panel within a region of said inner panel which is overlaid by an inner portion of said outer panel when said closure structure is assembled;
    applying an adhesive to said region of said inner panel containing said circular anchor pins;
    fixturing said outer and inner panels together;
    folding a portion of said outer panel over said region of the inner panel containing said circular anchor pins;
    coining an integral circular cap from said inner panel over each one of said plurality of anchor pins; and
    placing said vehicular closure structure in a storage medium for a length of time sufficient to allow said adhesive to at least partially cure.

7. A method according to claim 6, wherein said adhesive is filled with granular material.

8. A method according to claim 6, wherein said adhesive comprises a two-component adhesive.

9. A method according to claim 6, wherein said adhesive comprises a single-component adhesive.

* * * * *